US008720912B2

(12) United States Patent
Liao

(10) Patent No.: US 8,720,912 B2
(45) Date of Patent: May 13, 2014

(54) GOLF BAG CART

(75) Inventor: Gordon Liao, Tainan (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 0 days.

(21) Appl. No.: 13/525,599

(22) Filed: Jun. 18, 2012

(65) Prior Publication Data

US 2012/0261908 A1    Oct. 18, 2012

Related U.S. Application Data

(63) Continuation-in-part of application No. 12/248,088, filed on Oct. 9, 2008, now abandoned.

(51) Int. Cl.
*B62B 3/02*    (2006.01)
*B62B 3/12*    (2006.01)

(52) U.S. Cl.
USPC ............ 280/47.26; 280/651; 280/47.24

(58) Field of Classification Search
USPC ........ 280/35, 38, 40, 42, 43.1, 47.131, 47.17, 280/47.21, 47.24, 47.26, 47.34, 62.64, 638, 280/639, 641, 645, 646, 651, 652, 655, 280/DIG. 6, 62, 64
See application file for complete search history.

(56) References Cited

U.S. PATENT DOCUMENTS

| | | | |
|---|---|---|---|
| 2,705,967 A | 4/1955 | Volker et al. | 135/22 |
| 3,043,603 A | 7/1962 | Major, Sr. | 280/40 |
| 3,203,482 A | 8/1965 | Lyles | 175/299 |
| 3,459,434 A | 8/1969 | Dulaney | 280/38 |
| 3,797,845 A | 3/1974 | Kepka et al. | 280/822 |
| 3,987,807 A | 10/1976 | Varnell | 135/66 |
| 4,106,583 A | 8/1978 | Nemeth | 180/65.6 |
| 4,396,205 A | 8/1983 | Rosen | 280/646 |
| 4,917,392 A | 4/1990 | Ambasz | 280/40 |
| 5,048,777 A | 9/1991 | Quellais | 248/96 |
| 5,213,122 A | 5/1993 | Grady, II | 135/20.3 |
| 5,263,727 A | 11/1993 | Libit | 280/40 |
| 5,348,325 A | 9/1994 | Abrams | 280/40 |
| 5,361,794 A | 11/1994 | Brady | 135/147 |
| 5,451,072 A | 9/1995 | Weng | 280/646 |
| 5,558,357 A | 9/1996 | Wang | 280/647 |
| 5,582,419 A | 12/1996 | Lucia et al. | 280/42 |
| 5,590,674 A | 1/1997 | Eppenbach | 135/114 |
| 5,704,629 A | 1/1998 | Wu | 280/646 |
| 5,857,684 A | 1/1999 | Liao et al. | 280/40 |
| RE36,366 E | 11/1999 | Suk | 248/96 |
| 5,984,327 A | 11/1999 | Hsieh et al. | 280/47.24 |
| 6,007,031 A | 12/1999 | Tang | 248/96 |

(Continued)

*Primary Examiner* — J. Allen Shriver, II
*Assistant Examiner* — Travis Coolman
(74) *Attorney, Agent, or Firm* — Alan Kamrath; Kamrath IP Lawfirm, P.A.

(57) ABSTRACT

The golf bag cart includes a central base, a bottom cart stand, an upper cart stand, a wheel support, a first linkage, a second linkage, and a lock mechanism. The bottom cart stand has a top end fastened to the central base, a bottom end coupled with a front wheel, and a slider. The upper cart stand has a bottom end pivotally connected with the central base. Two wheel supports, disposed respectively and inclinedly at two sides of the central base, are joined with a steel wire to form a structure similar to a triangle. The first linkage connects the upper cart stand and the slider. The second linkage connects the slider and the wheel support. The lock mechanism mounted on the top end of the slider enables the upper cart stand and the bottom cart stand to lock with each other.

20 Claims, 16 Drawing Sheets

(56) References Cited

U.S. PATENT DOCUMENTS

| | | | |
|---|---|---|---|
| 6,050,592 A | 4/2000 | Kim | 280/652 |
| 6,216,382 B1 | 4/2001 | Lindaman | 43/2 |
| 6,416,077 B1 | 7/2002 | Chen et al. | 280/642 |
| 6,435,539 B1 | 8/2002 | Wu | 280/652 |
| 6,478,328 B1 | 11/2002 | Yeh et al. | 280/650 |
| 6,641,228 B2 | 11/2003 | Liu | 301/111.06 |
| 6,695,324 B1 | 2/2004 | Wu | 280/47.315 |
| 7,137,644 B2 | 11/2006 | Kimberley | 280/651 |
| 7,147,242 B2 | 12/2006 | Wu | 280/641 |
| 7,219,920 B2 | 5/2007 | Lin | 280/651 |
| 7,234,557 B2 | 6/2007 | Chen | 180/208 |
| 7,237,632 B2 * | 7/2007 | Liao | 180/19.3 |
| 7,311,323 B1 | 12/2007 | Lan | 280/642 |
| 7,841,615 B2 | 11/2010 | Yang | 280/652 |
| 8,366,140 B2 * | 2/2013 | Wu | 280/651 |
| 2003/0122353 A1 | 7/2003 | Liao | 280/651 |
| 2003/0201627 A1 | 10/2003 | Lin | 280/651 |
| 2004/0188984 A1 | 9/2004 | Cassoni | 280/652 |
| 2004/0195806 A1 | 10/2004 | Reimers et al. | 280/651 |
| 2005/0173895 A1 | 8/2005 | Lin | 280/651 |
| 2006/0097488 A1 | 5/2006 | Liao | 280/651 |
| 2008/0067786 A1 | 3/2008 | Liu et al. | 280/639 |
| 2008/0211206 A1 | 9/2008 | Thorne et al. | 280/650 |
| 2010/0052275 A1 * | 3/2010 | Reimers et al. | 280/47.26 |

* cited by examiner

FIG.5(PRIOR ART)
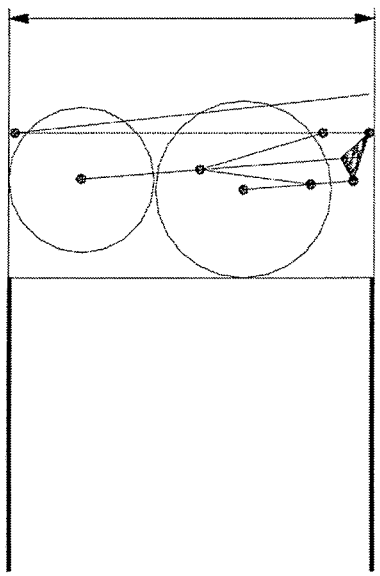
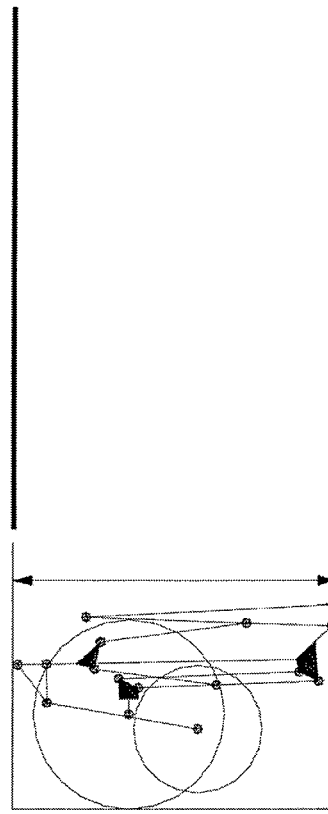
FIG.19

GOLF BAG CART

The present invention is a continuation-in-part of U.S. application Ser. No. 12/248,088, filed Oct. 9, 2008, now abandoned.

BACKGROUND OF THE INVENTION

1. Field of the Invention

The present invention generally relates to a golf bag cart and, in particular, to a structure which includes a steady cart-stand/frame to avoid deforming into collapse, which may stay stable to avoid capsizing in an unfolded and in-use mode, and which is capable of being compressed for easy packing and storage.

2. Description of the Prior Art

As disclosed in US 2010/0052275 A1, a golf bag cart of the prior art includes the arms of the wheels (the wheel supports) connected with the base tubes (the bottom cart stands) in a perpendicular mariner by the rear suspension assembly (the built-up connection base), with the arms as well as the base tubes being parallel to the ground. Because the horizontal base tubes are parallel to the ground, the parallel arms of the wheels offer no component force that shares the load of the golf bag cart and the golf bag when the cart stands/tubes carry the golf bag. Moreover, referring to FIGS. 1 & 2, component force E1 and F1 are totally converted into a moment of force which takes the rear suspension assembly as the pivoting point and takes said horizontal base tubes as the lever arm. Thus, the rear suspension assembly bears a twisting force, so that the base tubes may get deformed as well as damaged, and, consequently, the aforesaid situation may even cause the rear wheels to slant outward to collapse.

In addition, due to the situation that the arms of the wheels and the base tubes are parallel to the ground, the rear suspension assembly gets very close to the ground. Thus, referring to FIGS. 3 to 5, the handle and the cart stands/tubes, especially the upper stands/tubes, require a larger or longer size to produce a proper height of the golf bag cart fitting a user, so that the volume/size for storage and packing is large. The aforesaid deficiencies related to said prior art apparently need to be ameliorated.

Another golf bag cart of the prior art, US 2005/0173895A1, discloses a mode where merely the handle can be folded, the front wheel is folded backward through another device, and moreover, the volume/size for packing or storage is limited by the length as the upper cart stands should be as long as the golf bag or even more longer. Its apparent that the mentioned deficiency related to said prior art needs to be improved.

Referring to U.S. Pat. No. 5,451,072A, a further golf bag cart of the prior art provides a structure arranged with telescoping tubes among which the lower one must be the longest, the upper one is less long than the lower on; and the handle is the shortest. Moreover, the upper bracket of the golf bag has to be arranged on the top end of the upper tub, and the lower bracket of the golf bag has to be disposed on the bottom end of the lower tub, to enable the total height of the upper and lower tubes to be equal to the height of the golf bag. However, said structure may cause the total height of the golf bag cart to be insufficient. If the handle needs to be kept at a proper height fitting to a user, the lower tube, the upper tube and the handle which are arranged in a same straight line as well as the golf bag naturally form a greater angle with the ground. Thus, two phenomena occur as follows; one is that the base for securing the wheel arms/supports is too far from the ground, and the other is that the wheel arms/supports are shorter due to the limitation of the length of the lower tube. (Long wheel arms/supports will cause the golf bag cart to fall forward when folded.) In order to ensure the height of the handle, the angle between the wheel arms/supports and the lower tube should be less than 90 degrees. Limited by the foresaid conditions, the triangle formed by three points which attach to the ground is forced to shrink when the golf bag cart is in a fully unfolded and in-use mode. Thus, the stability of the golf bag cart in a standing mode is reduced, and it follows that the golf bag cart capsizes, which easily happens on the golf course usually located on land that slopes. The deficiency related to said prior art mentioned above needs to be ameliorated.

SUMMARY OF THE INVENTION

It is a primary object of the present invention to provide a golf bag cart including a steady cart-stand/frame to avoid deforming into collapse, staying stable to avoid capsizing in an unfolded and in-use mode, and being able to be compressed for easy packing and storage to ameliorate the deficiencies of the prior art.

In order to achieve the aforesaid objective, the present invention comprises a central base, a bottom cart stand provided with a slider thereon and having a top end fastened to the central base as well as a bottom end coupled with a front wheel, an upper cart stand having a bottom end pivotally connected with the central base, wheel supports with rear wheels at the bottom end thereof disposed respectively and inclinedly at two sides of the central base and joined with a steel wire to form a structure similar to a triangle, a first linkage connecting the upper cart stand and the slider, a second linkage connecting the slider and the wheel support, and a lock mechanism on the top end of the slider enabling the upper cart stand and the bottom cart stand to lock with each other. In an unfolded mode, the two wheel supports, the bottom cart stand, the two second linkages and the steel wire form one tetrahedral structure, so that the central base needs not bear alone all the moment of force delivered from the front and rear wheels to enable the cart-stand/frame structure to stay steady and further to avoid deforming into collapse.

Moreover, the wheel supports are disposed respectively and inclinedly at two sides of the central base, so that the central base itself, the two wheel supports, the bottom cart stand and the ground form another tetrahedral structure which enables the cart-stands/frames together to share the proper height of the golf bag cart fitting a user, and, furthermore, which allows the length of the upper cart stand as well as the bottom cart stand to be shortened to compress the cart for packing and storage.

BRIEF DESCRIPTION OF THE DRAWINGS

FIG. 5 is a linear schematic diagram showing the golf bag cart of the prior art in a folded mode.

FIG. 19 is a linear schematic diagram showing the golf bag cart of the present invention in a fully-folded mode.

DESCRIPTION OF THE PREFERRED EMBODIMENTS

The features and functions of the present invention will become apparent from the following description, taken in connection with the accompanying drawings, wherein preferred embodiments of the present invention are disclosed.

Referring to FIGS. 6 to 10, the structure of the present invention, i.e. the golf bag cart, has left-right symmetry. Therefore, only one side of the structure related to the present invention will be exemplified and described.

Figure 9:
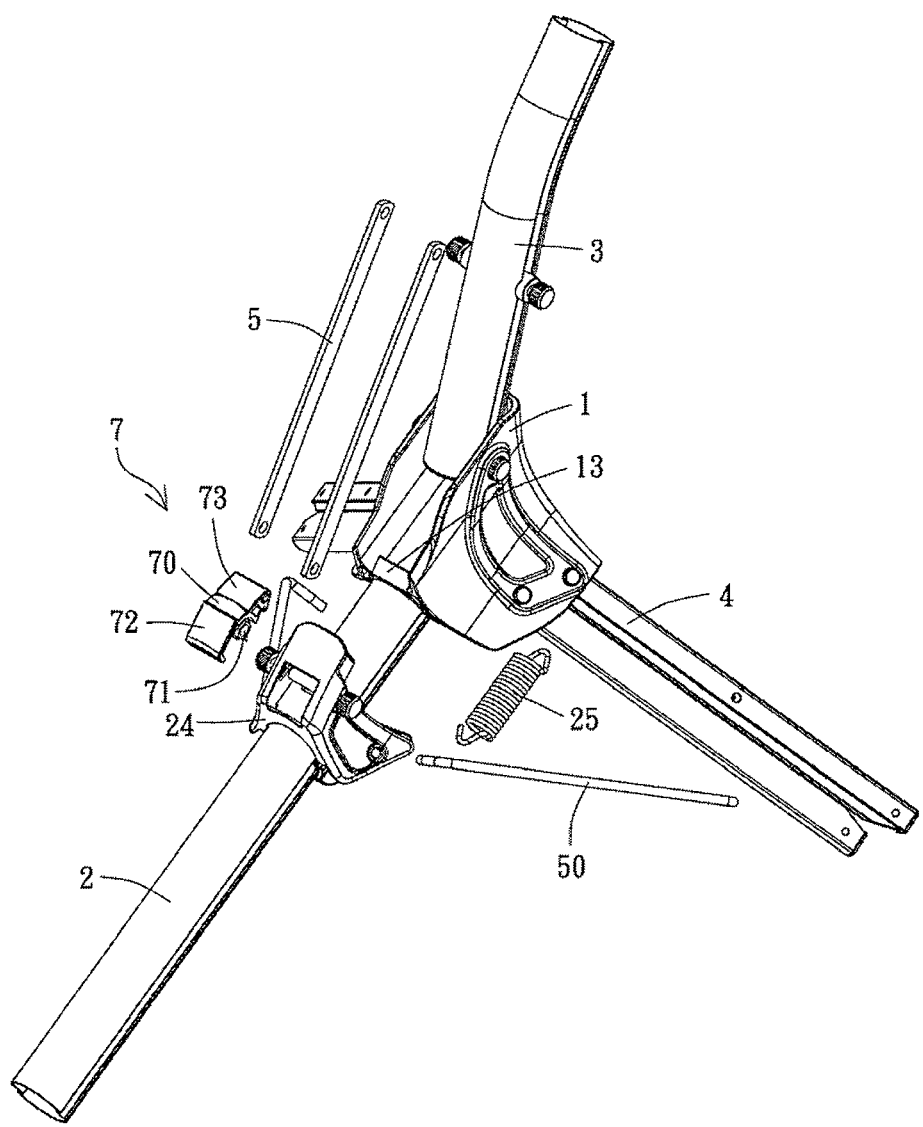
FIG. 9 is a breakdown illustration of the lock mechanism of the golf bag cart of the present invention.
Figure 10:
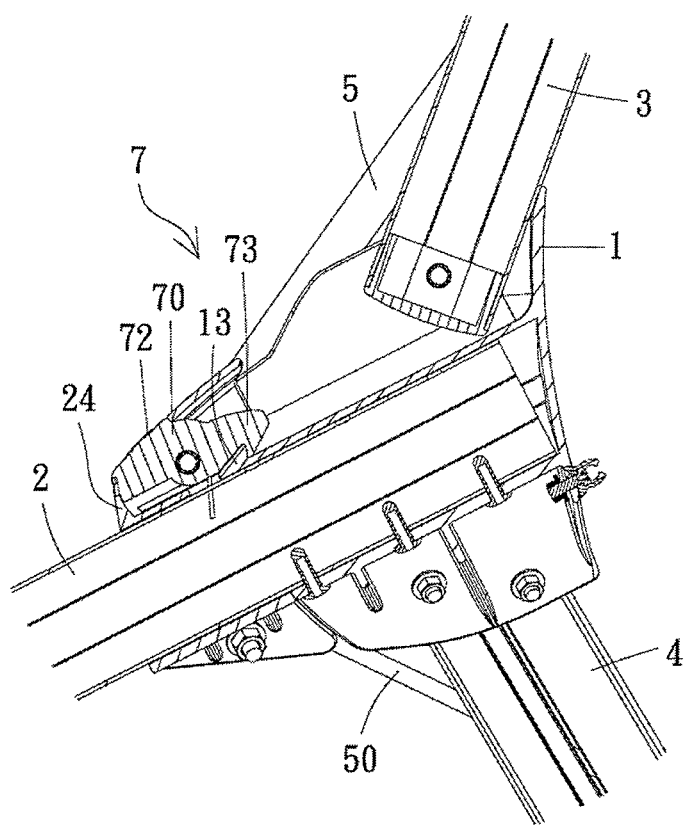
FIG. 10 is a sectional view of the lock mechanism assembly of the golf bag cart of the present invention.
Figure 13:
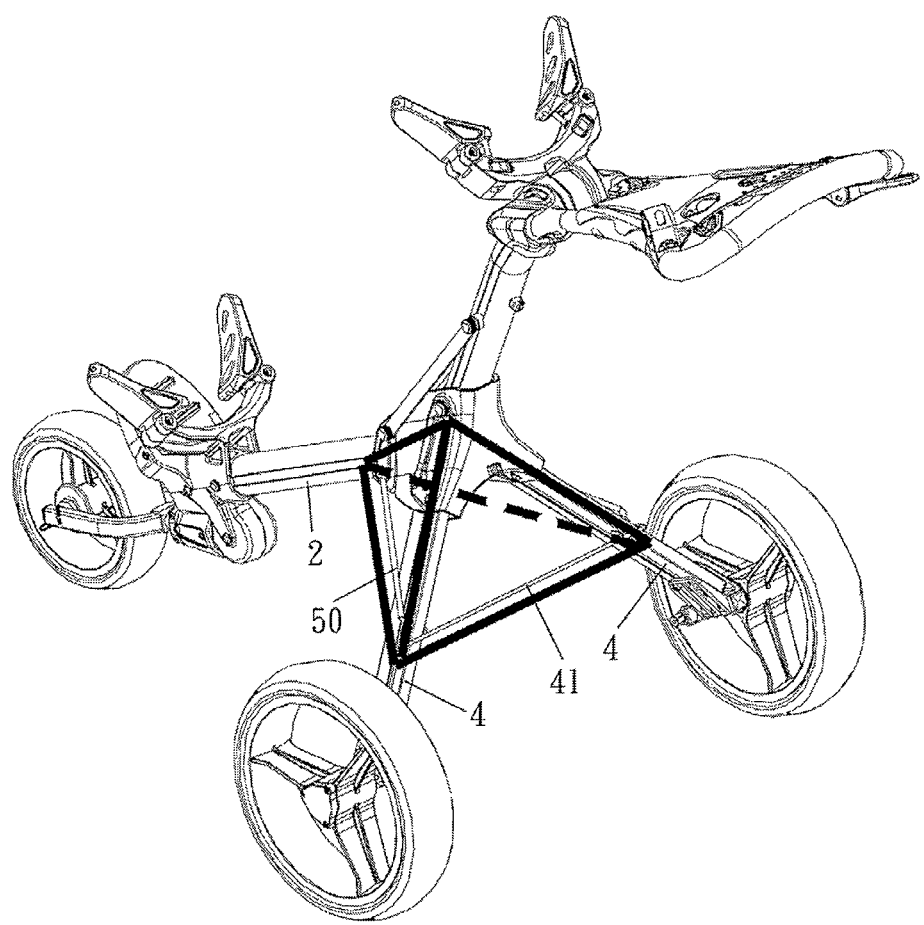
FIG. 13 is a schematic diagram showing one tetrahedral structure of the golf bag cart of the present invention.

The present invention comprises a central base 1, a bottom cart stand 2, an upper cart stand 3, a wheel support 4, a first linkage 5, a second linkage 50, a front wheel 6, and a lock mechanism 7. The bottom cart stand 2 has a top end fastened to the central base 1 and a bottom end configured with a lower bag holder 22. The bottom cart stand 2 is provided with a groove 23 on opposite diametric sides for the arrangement of a slider 24. A spring 25 is located is internally within the bottom cart stand 2 and has one end attached to the central base 1 and the other end to the slider 24. The upper cart stand 3 has a bottom end pivotally connected with the central base 1. Two wheel supports 4 are disposed respectively and inclinedly at two sides of the central base 1. Each wheel support 4 has one end secured to the central base 1 by fasteners 11 & 12 and the other end coupled with a rear wheel 40. A steel wire 41 links the two wheel supports 4, so that the steel wire 41 and the two wheel supports 4 are able to form a structure similar to a triangle. Further, the steel wire 41, the two wheel supports 4, the bottom cart stand 2 and the two second linkages 50 form a tetrahedral structure, as shown in FIG. 13. The first linkage 5 has one end joined to the upper cart stand 3 and the other end to the slider 24 to link up the movement of the upper cart stand 3 with the movement of the slider 24. The second linkage 50 links the slider 24 and the wheel support 4 so that the movements of the slider 24 and the wheel support 4 are able to be connected. The front wheel 6 is coupled with a hinge 221 of the lower bag holder 22 by a folding joint 60. Moreover, the lock mechanism 7 mounted on the top end of the slider 24, as shown in FIGS. 9 & 10, includes a core 70 and a torque spring 71 in the middle. One end of the core 70 has a resilient buckle 72, and the other end has a clasp hook 73 for seizing a triangle-shaped clasp chunk 13 protruded on the central base 1.

Figure 11:
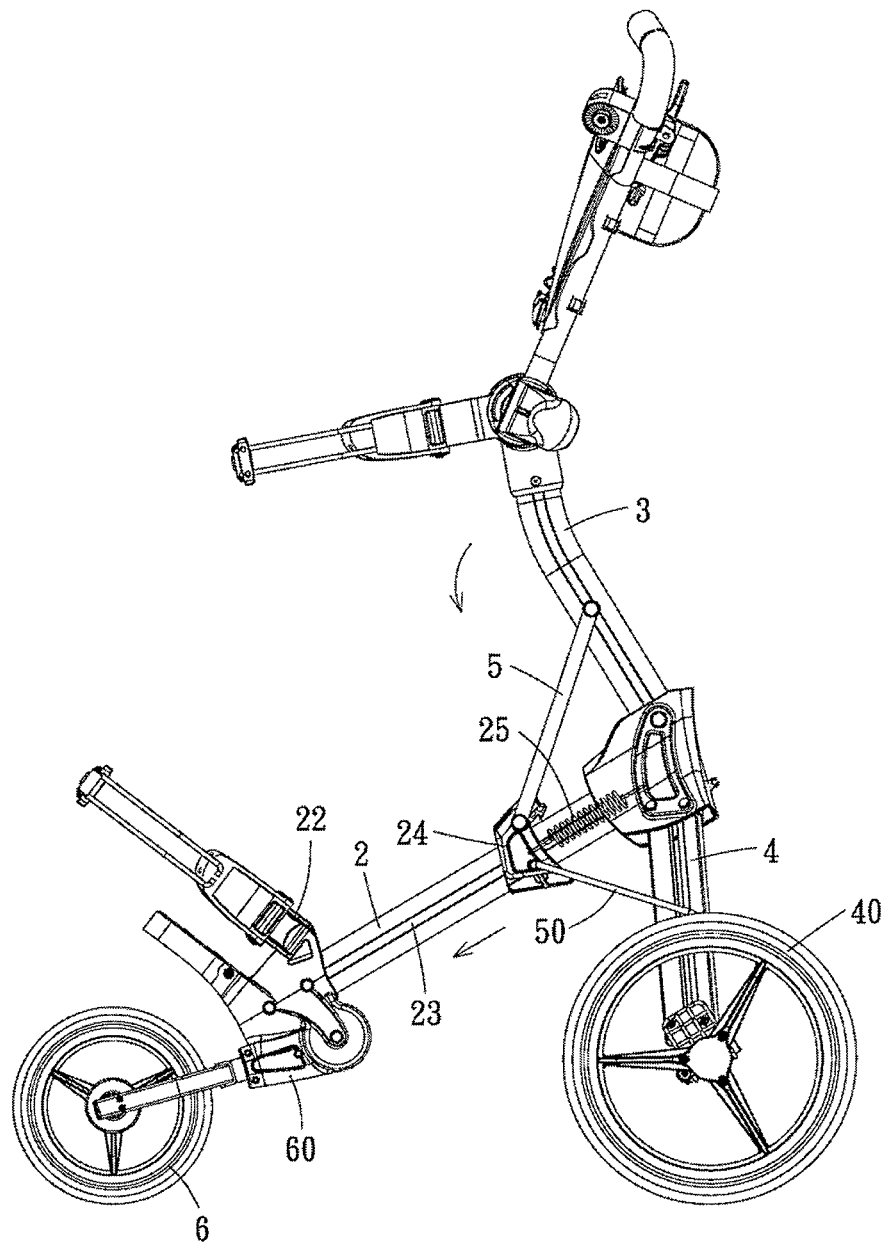
FIG. 11 is a schematic diagram showing the motions of folding the golf bag cart of the present invention.
Figure 12:
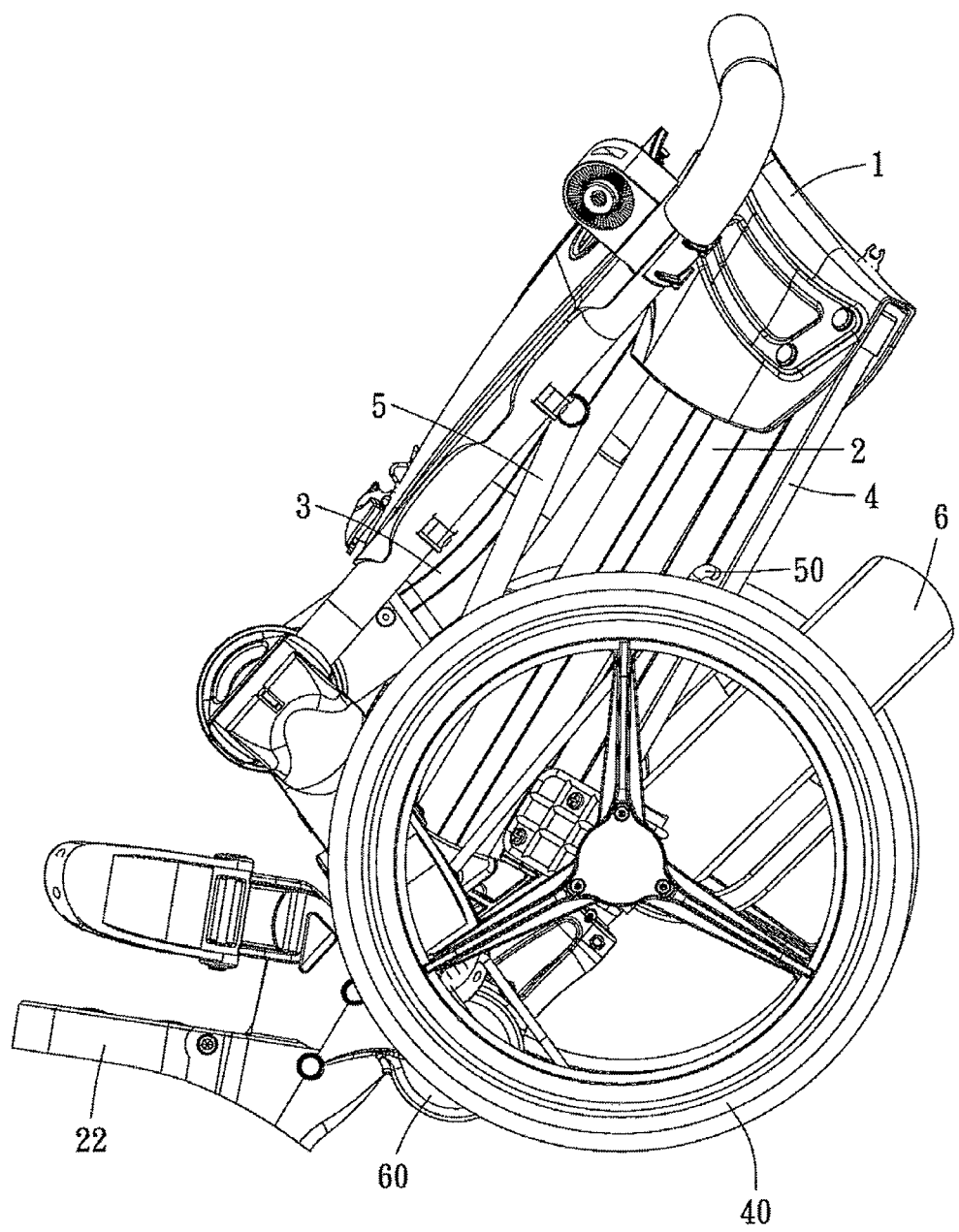
FIG. 12 is a stereogram showing the golf bag cart of the present invention in a fully-folded mode.

According to the aforesaid structure, folding is carried out by firstly releasing the lock mechanism 7 to separate the clasp hook 73 from the clasp chunk 13, followed by turning the upper cart stand 3 forward and downward, as shown in FIG. 11. Thus, the slider 24 slides forward along the bottom cart stand 2 with the push from the first linkage 5 and simultaneously drives the second linkage 50 to pull the wheel support 4 to move forward and inward to enable the rear wheel 40 to move forward and to be folded inward. Finally, by operating the folding joint 60, the front wheel 6 is turned inward to be folded and to be positioned under the bottom cart stand 2, as shown in FIG. 12.

Briefly, the process to fold the present invention is firstly to release the lock mechanism 7, then, to twist the upper cart stand 3 closely to the bottom cart stand 2, and, finally, to operate the folding joint 60 to level the front wheel 6 and to turn it inward until the present invention is fully folded. Obviously, it is easy to operate.

Conversely, unfolding may be achieved by firstly turning the front wheel 6 forward and flipping it over to a fixed position, followed by turning the upper cart stand 3 upward to drive the first linkage 5, the slider 24, the second linkage 50 and the wheel supports 4 to move, so that the slider 24 may slide toward the central base 1 and the rear wheels 40 may spread outward simultaneously. Moreover, when the slider 24 approaches the central base 1, the bottom cart stand 2 and the upper cart stand 3 may lock with each other by fastening the clasp hook 73 of the lock mechanism 7 together with the clasp chunk 13 on the central base 1.

Figure 6:
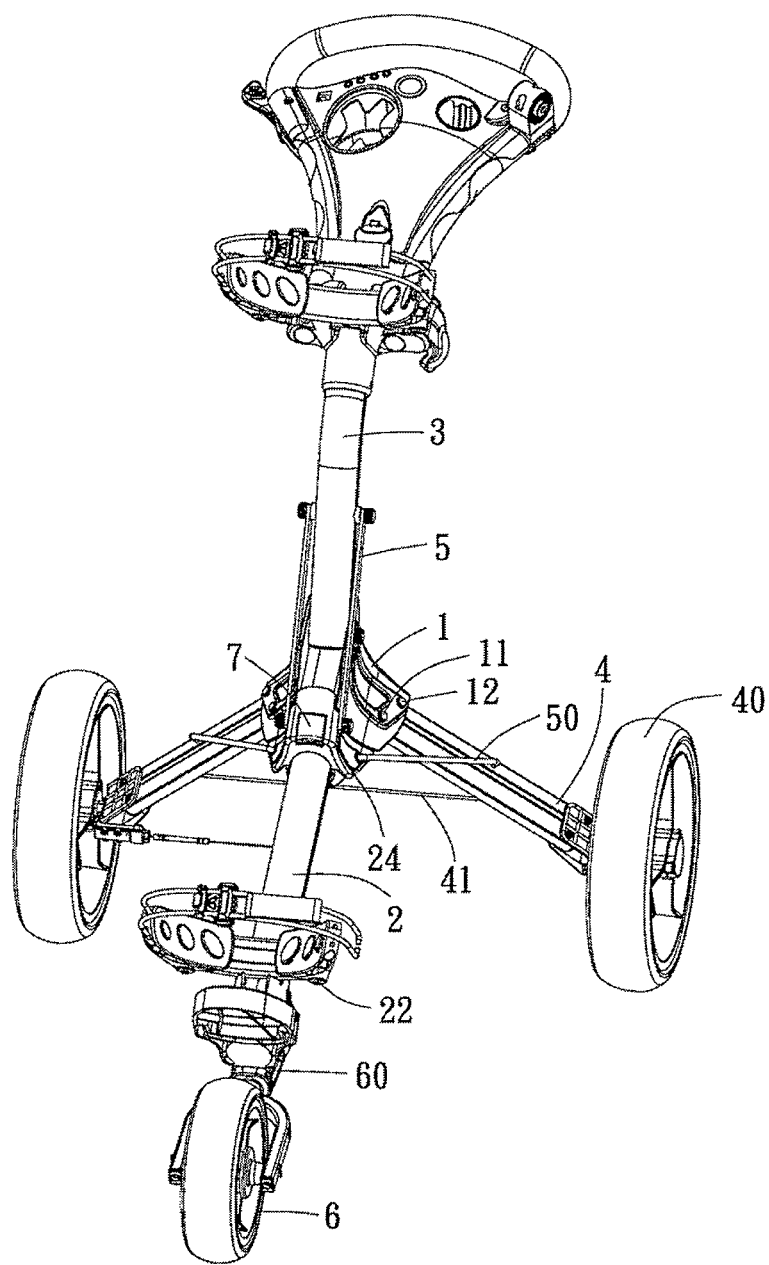
FIG. 6 is a first stereogram of the golf bag cart of the present invention.
Figure 7:
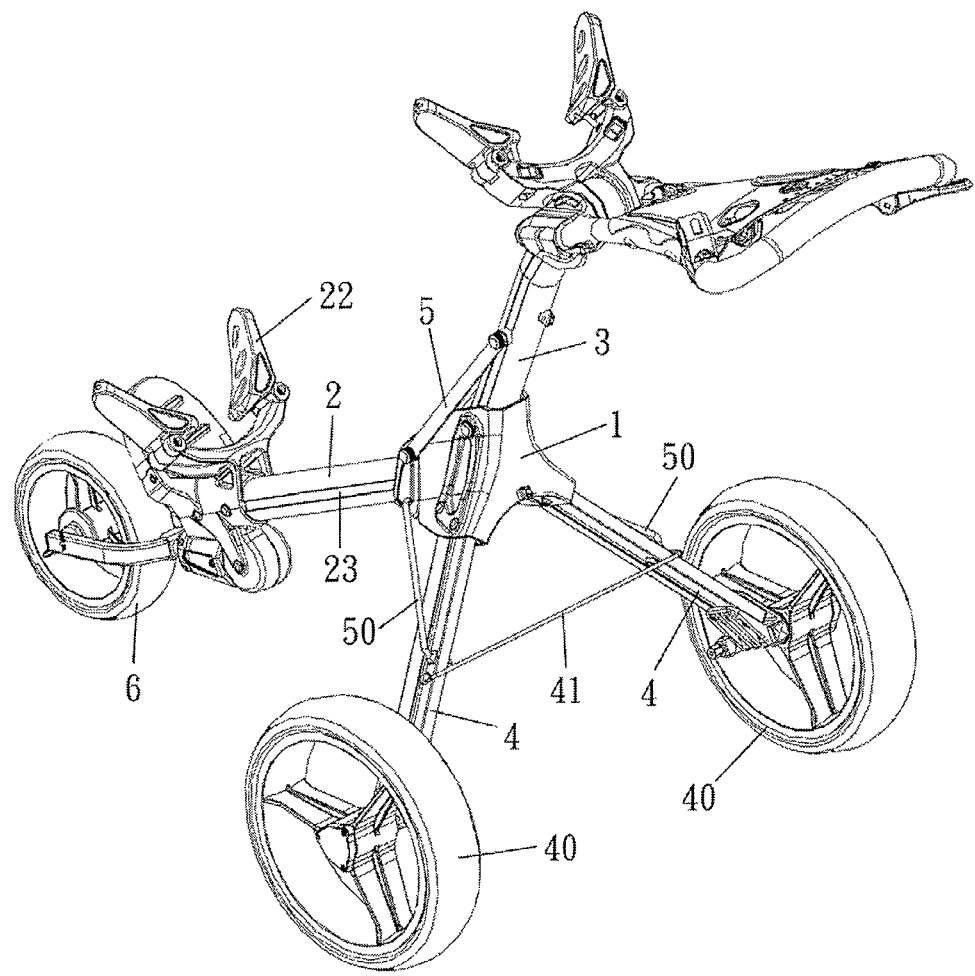
FIG. 7 is a second stereogram of the golf bag cart of the present invention.
Figure 8:
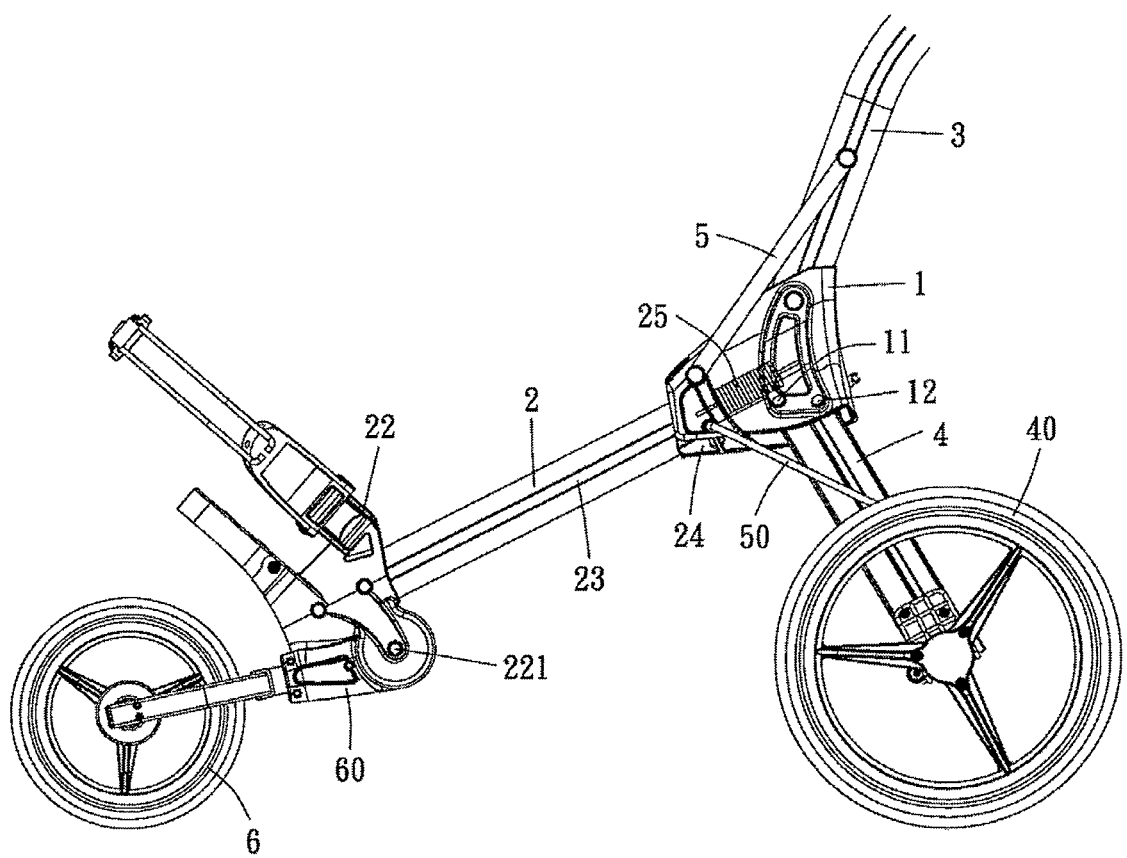
FIG. 8 is a sectional view of the golf bag cart of the present invention.
Figure 14:
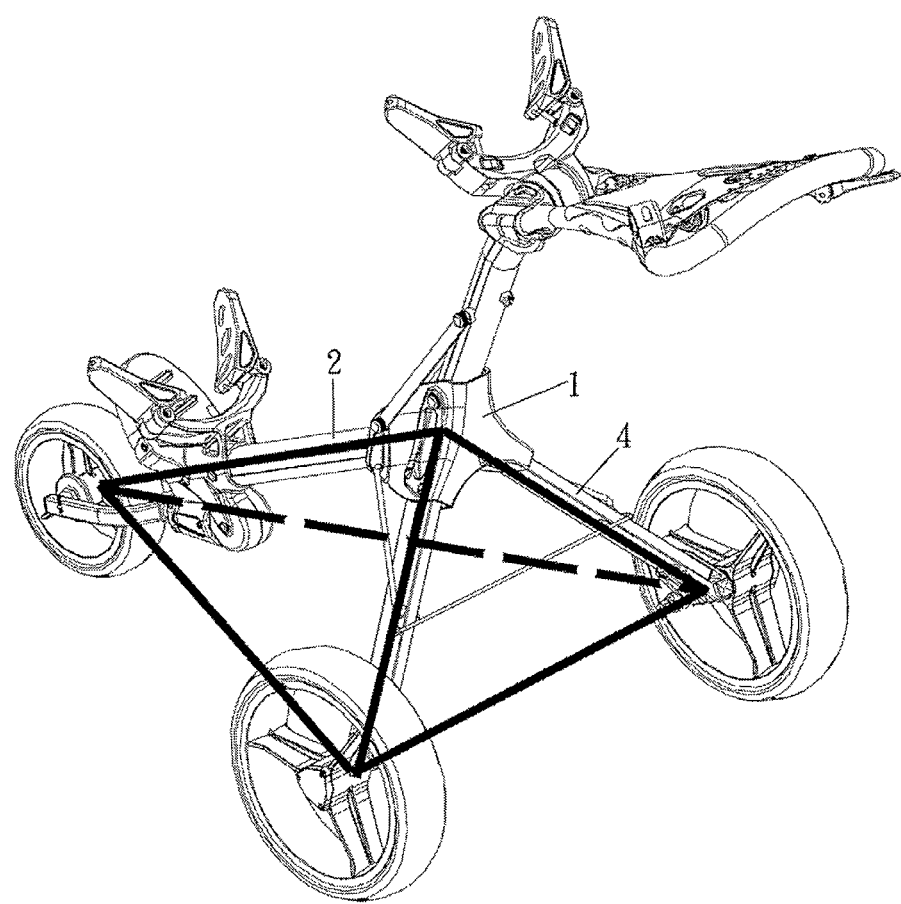
FIG. 14 is a schematic diagram showing another tetrahedral structure of the golf bag cart of the present invention.

In addition, several important features related to folding and unfolding of the present invention are further described as follows:

(I) When the present invention is fully unfolded, the two wheel supports 4, the bottom cart stand 2 and the ground form a tetrahedral structure, as shown in FIG. 14. Since the fasteners 11 & 12 for joining the central base 1 and the wheel supports 4 are not vertical to the ground, the fasteners have an included angle with respect to the ground. The foregoing condition causes the wheel supports 4 to be inclinedly pivotally secured to the central base 1, as shown in FIGS. 6 & 7. In addition, the two wheel supports 4, the bottom cart stand 2, the two linkages 50 and the steel wire 41 form another tetrahedral structure, as shown in FIG. 13, which provides a better and sufficient support force to bear the bag downward load and enables the cart-stand/frame to stay steadier to avoid deforming into collapse.

(II) The bottom cart stand 2 is provided with a groove 23 on each of the opposite diametric sides thereof for receiving the slider 24, so that between the slider 24 and the surface of the bottom cart stand 2 is a space which may prevent the slider 24 from scraping the surface of the bottom cart stand 2 to avoid deteriorating the appearance.

(III) The bottom cart stand 2 is provided with a spring 25 located internally, so that, as shown in FIG. 11, the slider 24 sliding forward along the bottom cart stand 2 will simultaneously elongate the spring 25 when the golf bag cart is folded. Conversely, when the golf bag cart is unfolded, the restored force of the spring 25 may assist the slider 24 in sliding along the bottom cart stand 2 to facilitate the operation of unfolding to save strength.

According to the aforesaid description, the present invention obviously provides the following advantages and functions which are much more progressive than the prior art.

Figure 1:
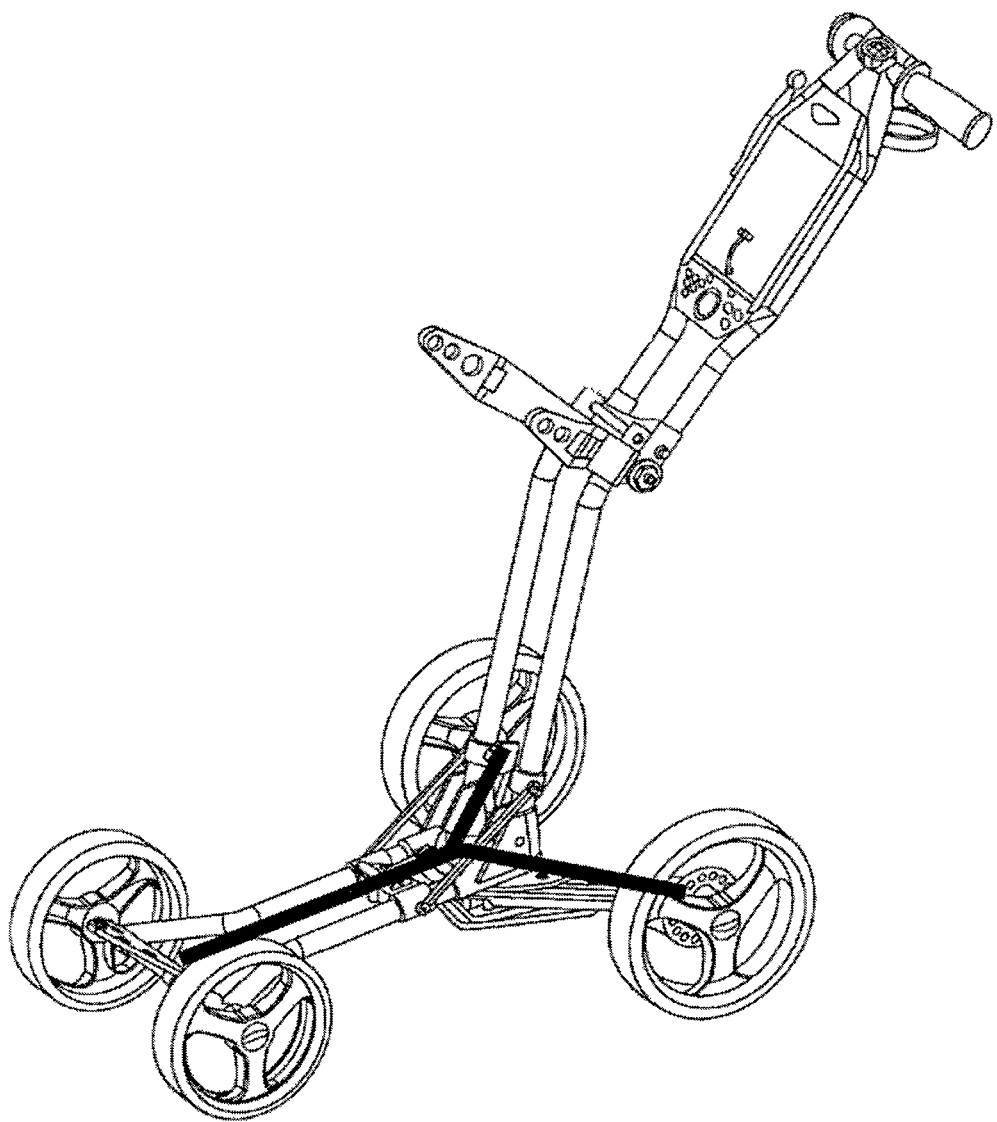
FIG. 1 is a schematic stereogram of the golf bag cart of the prior art.

I. Due to the central base 1 inclinedly secured with the wheel supports 4 at two sides thereof, the two wheel supports 4, the bottom cart stand 2, the two second linkages 50 and the steel wire 41 form a tetrahedral structure, as shown in FIG. 13, which obviously provides a steadier cart-stand/frame structure than the planar structure of the golf bag cart of the prior art, as shown in FIG. 1.

Figure 2:
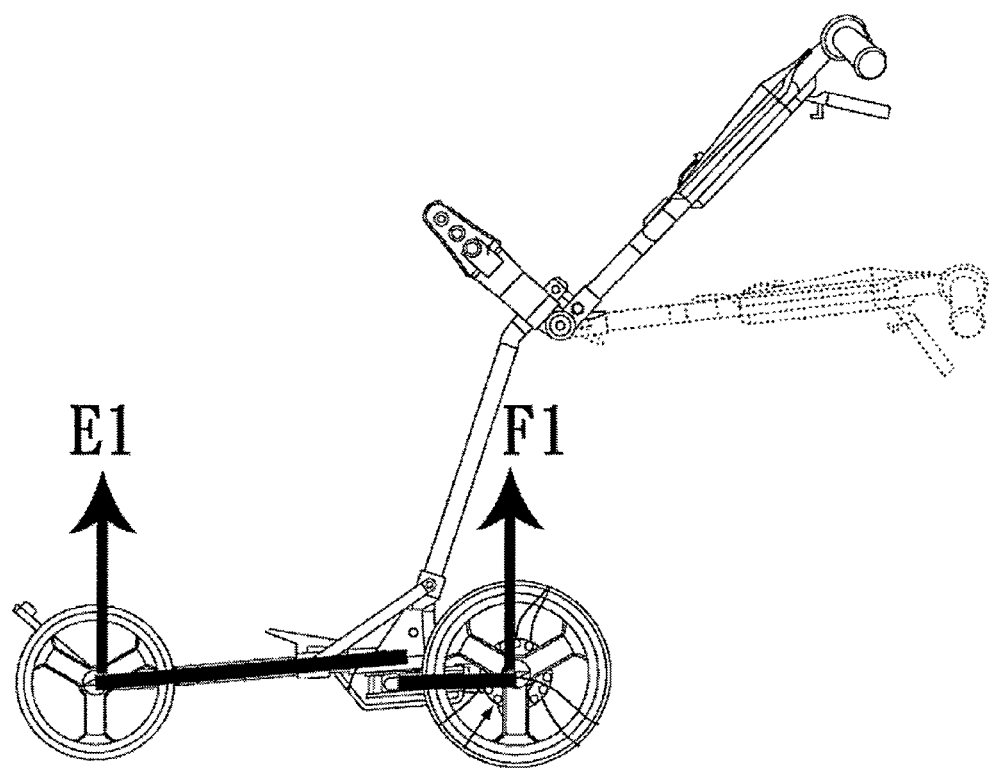
FIG. 2 is a schematic diagram showing the golf bag cart of the prior art receiving force.
Figure 15:
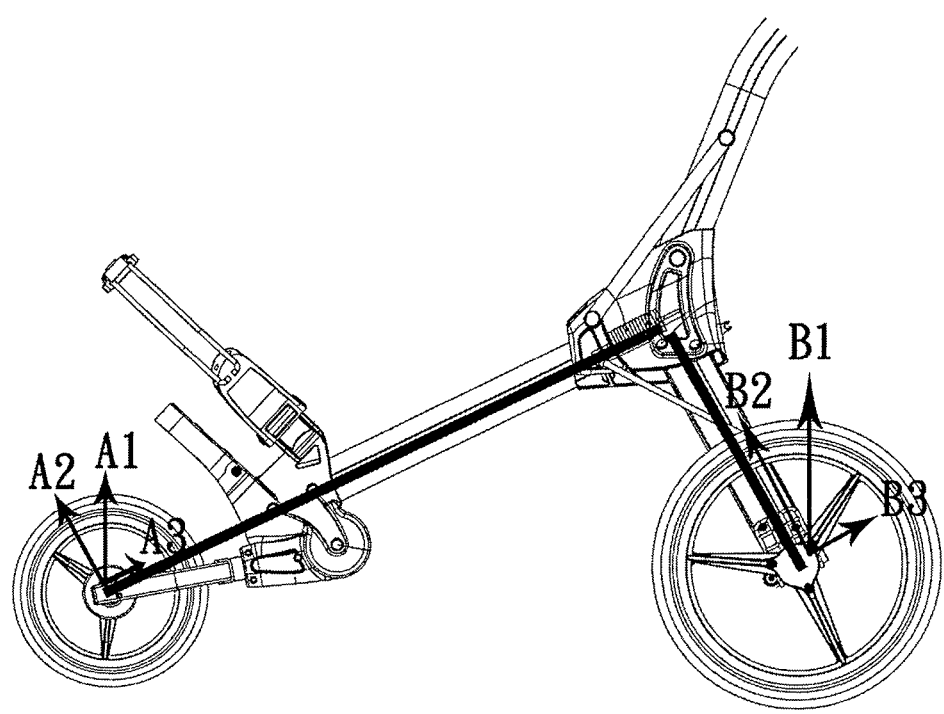
FIG. 15 is a first schematic diagram showing the golf bag cart of the present invention receiving force.
Figure 16:
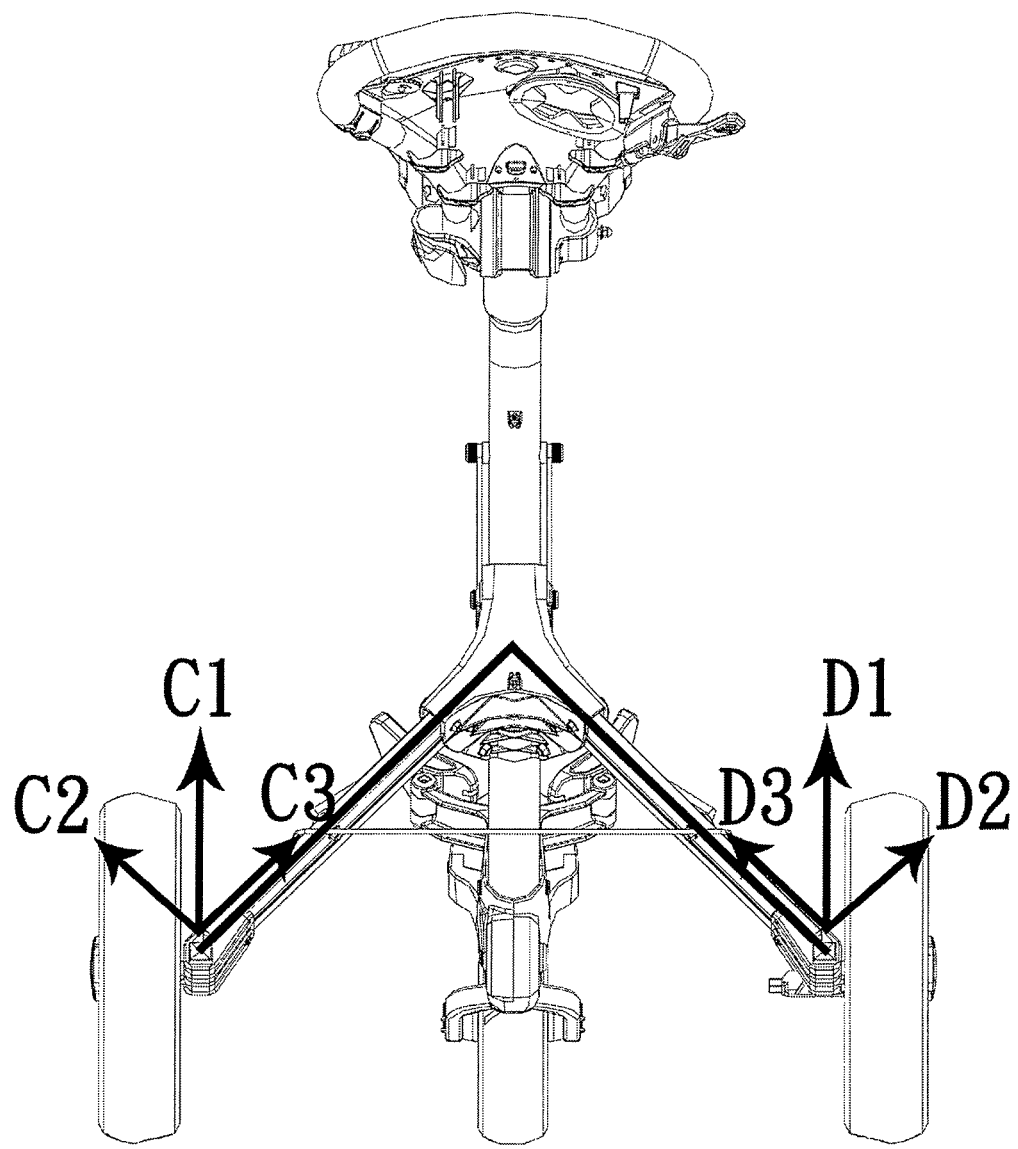
FIG. 16 is a second schematic diagram showing the golf bag cart of the present invention receiving force.

II. Due to the central base 1 inclinedly secured with the wheel supports 4 at two sides thereof, the two wheel supports 4, the bottom cart stand 2 and the ground form a tetrahedral structure, as shown in FIG. 14. When the golf bag cart carries the golf bag, A1, B1, C1 and D1 shown in FIGS. 15 & 16 are the forces that the golf bag cart receives, and merely component force A2, B3, C2 and D2 produce a moment of force which takes the bottom cart stand 2 and the wheel supports 4 as the lever arm. Moreover, the component force A3, B2, C3 and D3, which are parallel to the bottom cart stand 2 and the wheel supports 4, counterbalance one another. Compared with the golf bag cart of the prior art, as shown in FIG. 2, the structure disclosed by the present invention may reduce the twisting force which the cart-stands/frames receive, especially the central base 1, to ensure the cart-stands/frames are steady.

Figure 3:
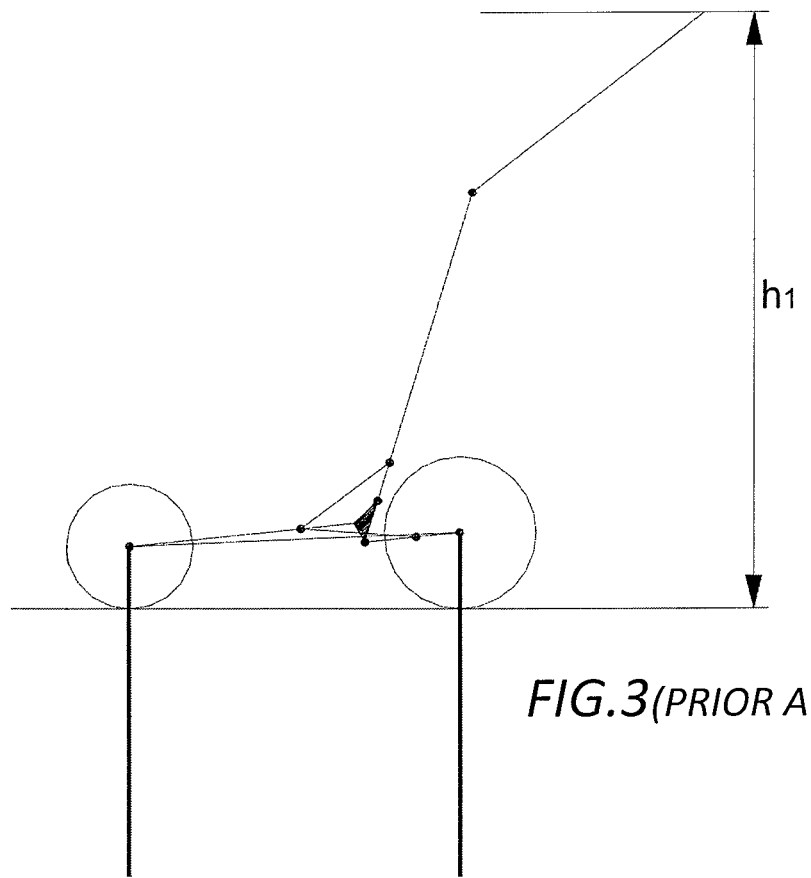
FIG. 3 is a first linear schematic diagram showing the golf bag cart of the prior art in an unfolded mode.
Figure 17:
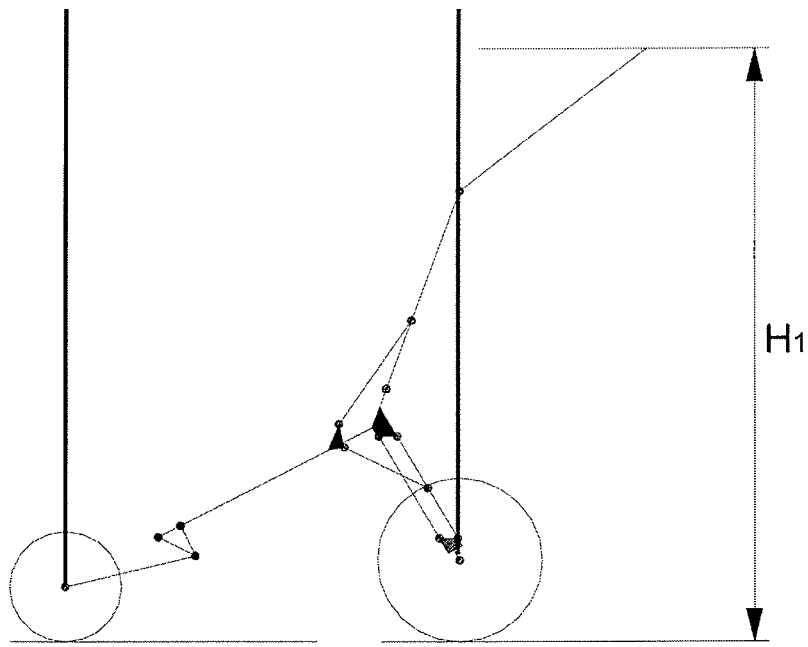
FIG. 17 is a first linear schematic diagram showing the golf bag cart of the present invention in a fully-unfolded mode.

III. Based on the central base 1 inclinedly secured with the wheel supports 4 at two sides thereof, the central base 1 itself, the two wheel supports 4, the bottom cart stand 2 and the ground form a tetrahedral structure, as shown in FIG. 14, to share a proper height of the golf bag cart fitting a user with the upper cart stand 3, as shown in FIG. 17. Compared with the prior art depicted in FIG. 3, referring to the same handlebar-height (h1=H1) and the same position of the handlebar, the present invention obviously not only has a smaller volume than the prior art when being folded, but also has a longer wheelbase than the prior art when being unfolded. Therefore, the present invention is capable of being compressed for packing as well as storage, and, furthermore, it may provide better stability to avoid capsizing in an unfolded and in-use mode.

IV. The upper cart stand 3 pivotally connected to the top of the central base 1 enables the upper cart stand 3 to be folded/twisted closely to the bottom cart stand 2, as shown in FIG. 19. Compared with the prior art shown in FIG. 5, obviously the present invention is smaller in size of volume in a fully-folded mode. That is, the present invention provides a function that allows compression of its volume for easy packing and storage.

Figure 4:
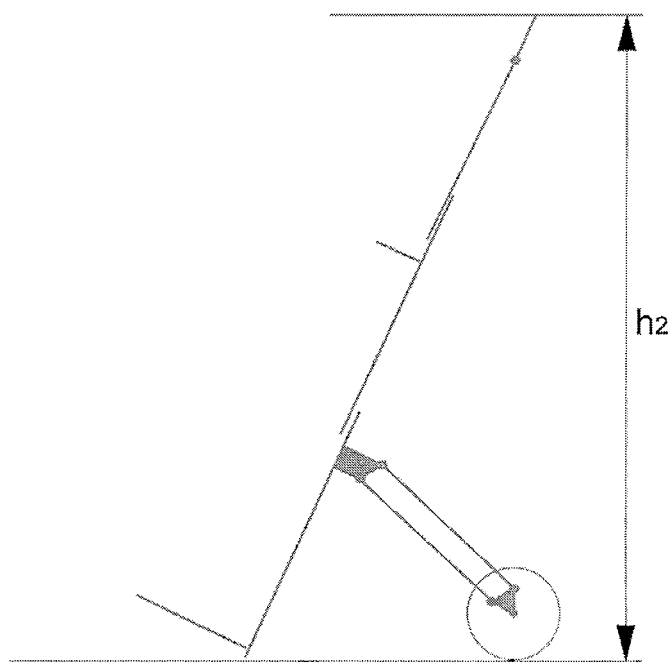
FIG. 4 is a second linear schematic diagram showing the golf bag cart of the prior art in an unfolded mode.
Figure 18:
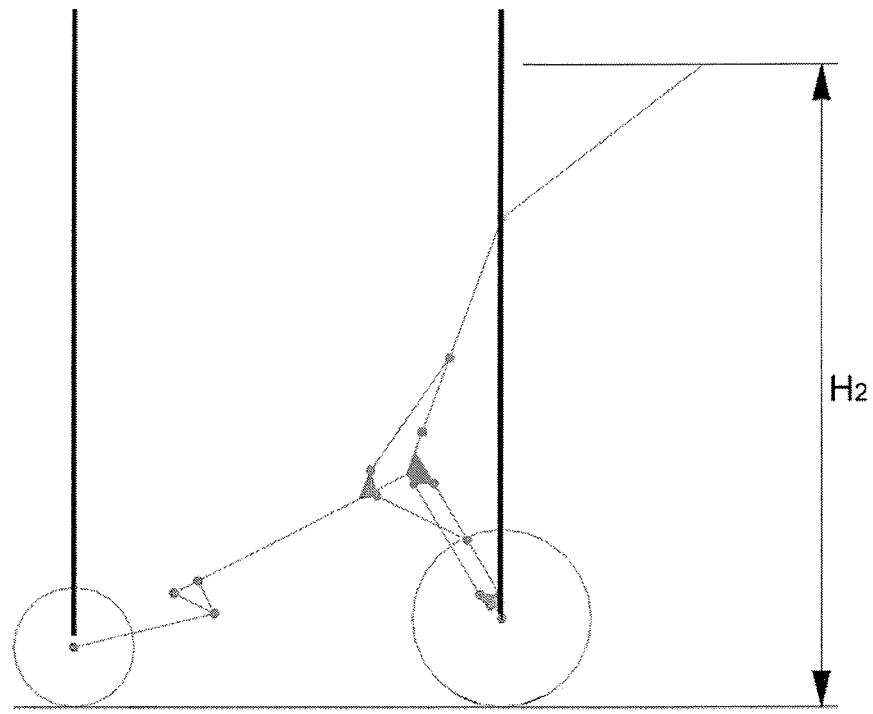
FIG. 18 is a second linear schematic diagram showing the golf bag cart of the present invention in a fully-unfolded mode.

V. The bottom cart stand 2 is secured to the central base 1 whose top end pivotally connects with the upper cart stand 3, so that the upper cart stand 3 forms an angle with the bottom cart stand 2 when the present invention is fully unfolded and in-use, as shown in FIG. 18. Compared with the prior art as shown in FIG. 4, it is apparent that at the same handlebar-height (h2=H2) the present invention allows lowering the position of the central base to enable the wheel supports to spread backward to form an angle greater than 90 degrees with the bottom cart stand 3, and further to produce a longer wheelbase. Obviously, the present invention is able to provide better stability to avoid capsizing.

VI. The bottom cart stand 2 is arranged with a spring 25 located internally for facilitating the operation of unfolding the cart-stands/frames to save strength.

As aforesaid, the structure of the preferred embodiments of the present invention described above is capable of ameliorating the deficiencies of the prior arts and achieving the expected objective and function, so that it can be regarded as a novel and progressive invention.

What is claimed is:

1. A golf bag cart comprising:
   a central base;
   a bottom cart stand having a top end fastened to the central base as well as a bottom end coupled with a front wheel, with the bottom cart stand provided with a slider thereon;
   an upper cart stand having a bottom end pivotally connected with the central base;
   wheel supports each having a bottom end arranged with a rear wheel, disposed respectively and inclinedly at two sides of the central base, and joined with a wire to form a structure similar to a triangle;
   a first linkage connecting the upper cart stand and the slider;
   a second linkage connecting the slider and the wheel support; and
   a lock mechanism mounted on the top end of the slider and locking the upper cart stand as well as the bottom cart stand with each other.

2. The golf bag cart as claimed in claim 1, wherein the upper and bottom cart stands are pivotal within a pivot plane between folded and unfolded modes, wherein the wheel supports include upper ends pivotally joined to the central base with the upper ends located intermediate the lower ends of the wheel supports and the upper cart stand and incline away from the upper cart stand perpendicular to the pivot plane and the bottom cart stand outwardly at an obtuse angle to the pivot plane in the unfolded mode, wherein the wheel supports incline forwardly toward the front end of the bottom cart stand at an acute angle to the bottom cart stand in the folded position, with the wire joined to the wheel supports as the upper and bottom cart stands pivot between the folded and unfolded modes.

3. The golf bag cart as claimed in claim 2, wherein the front wheel is coupled to the bottom end of the bottom cart stand by a folding joint having a pivot axis perpendicular to the bottom cart stand.

4. The golf bag cart as claimed in claim 3, further comprising a lower bag holder at the bottom end of the bottom cart stand, with the lower bag holder including a hinge, with the front wheel coupled with the hinge of the lower bag holder by the folding joint, with the front wheel located intermediate the pivot axis and the central base in the folded mode.

5. The golf bag cart as claimed in claim 4, further comprising a handlebar pivotally connected with an upper end of the upper cart stand, with the first linkage connecting the upper cart stand spaced from and intermediate the bottom and upper ends of the upper cart stand.

6. The golf bag cart as claimed in claim 5, wherein the wheel supports, the wire, the bottom cart stand and the second linkages form a tetrahedral structure.

7. The golf bag cart as claimed in claim 6, wherein the central base, the wheel supports, the bottom cart stand and the ground form a tetrahedral structure.

8. The golf bag cart as claimed in claim 2, wherein the central base, the wheel supports, the bottom cart stand and the ground form a tetrahedral structure.

9. The golf bag cart as claimed in claim 8, wherein the front wheel is coupled to the bottom end of the bottom cart stand by a folding joint having a pivot axis perpendicular to the bottom cart stand.

10. The golf bag cart as claimed in claim 9, further comprising a lower bag holder at the bottom end of the bottom cart stand, with the lower bag holder including a hinge, with the front wheel coupled with the hinge of the lower bag holder by the folding joint, with the front wheel located intermediate the pivot axis and the central base in the folded mode.

11. The golf bag cart as claimed in claim 10, further comprising a handlebar pivotally connected with an upper end of the upper cart stand, with the first linkage connecting the upper cart stand spaced from and intermediate the bottom and upper ends of the upper cart stand.

12. The golf bag cart as claimed in claim 11, wherein the wheel supports, the wire, the bottom cart stand and the second linkages form a tetrahedral structure.

13. The golf bag cart as claimed in claim 1, wherein the central base, the wheel supports, the bottom cart stand and the ground form a tetrahedral structure.

14. The golf bag cart as claimed in claim 2, wherein the wheel supports, the wire, the bottom cart stand and the second linkages form a tetrahedral structure.

15. The golf bag cart as claimed in claim 1, wherein the front wheel is coupled to the bottom end of the bottom cart stand by a folding joint having a pivot axis perpendicular to the bottom cart stand.

16. The golf bag cart as claimed in claim 15, further comprising a lower bag holder at the bottom end of the bottom cart stand, with the lower bag holder including a hinge, with the front wheel coupled with the hinge of the lower bag holder by the folding joint, with the front wheel located intermediate the pivot axis and the central base in a folded mode.

17. The golf bag cart as claimed in claim 16, further comprising a handlebar pivotally connected with an upper end of the upper cart stand, with the first linkage connecting the upper cart stand spaced from and intermediate the bottom and upper ends of the upper cart stand.

18. The golf bag cart as claimed in claim 1, wherein the wheel supports, the wire, the bottom cart stand and the second linkages form a tetrahedral structure.

19. The golf bag cart as claimed in claim 1, wherein the central base, the wheel supports, the bottom cart stand and the ground form a tetrahedral structure.

20. The golf bag cart as claimed in claim 1, wherein the wheel supports are moveable relative to the bottom cart stand between folded and unfolded modes, with the rear wheels of the wheel supports spaced further in the unfolded mode than in the folded mode, with the wire joined to the wheel supports moving between the folded and unfolded modes, with the structure similar to the triangle being formed in the unfolded mode.

* * * * *